United States Patent [19]
Münzebrock et al.

[11] Patent Number: 5,859,373
[45] Date of Patent: Jan. 12, 1999

[54] APPARATUS AND PROCESS FOR DETERMINING THE INSTANTANEOUS AND CONTINUOUS LOADS ON A LIFTING MECHANISM

[75] Inventors: Anton Münzebrock, Dortmund; Eberhard Schröder, Halver; Michael Hülsmann, Herdecke, all of Germany

[73] Assignee: Mannesmann Aktiengesellschaft, Düsseldorf, Germany

[21] Appl. No.: 840,859

[22] Filed: Apr. 17, 1997

[30] Foreign Application Priority Data

Apr. 19, 1996 [DE] Germany .................. 196 17 105.9

[51] Int. Cl.$^6$ ....................................................... G01L 1/04
[52] U.S. Cl. ................................... 73/862.68; 73/862.193
[58] Field of Search ...................... 73/862.381, 862.68, 73/862.191, 862.193, 826

[56] References Cited

U.S. PATENT DOCUMENTS

| | | | |
|---|---|---|---|
| 4,060,841 | 11/1977 | Allen | 361/33 |
| 4,106,580 | 8/1978 | DeMasters et al. | 177/205 |
| 4,423,785 | 1/1984 | Kuihara et al. | 172/3 |
| 4,623,041 | 11/1986 | Horbriiger et al. | 187/29 |
| 4,979,401 | 12/1990 | Maeda | 73/862.193 |

FOREIGN PATENT DOCUMENTS

| 28 23 401 | 12/1979 | Germany . |
|---|---|---|
| 295 03 416 | 8/1995 | Germany . |

OTHER PUBLICATIONS

Article entitled "Ein einfaches elektrisches Lastmeßgerät auf Kranen" Kirmenschrift der AEG, Sonderdruck aus Hansa, Zentralorgan für Schiffahrt–Schiffbau, H. 25.26 (1959) by K. Bötz, pp. 1291–1292.

*Primary Examiner*—Max H. Noori
*Attorney, Agent, or Firm*—Cohen, Pontani, Lieberman & Pavane

[57] ABSTRACT

A process and apparatus for determining a load on a lifting mechanism including a load measuring device and a three-phase induction motor operable for lifting and lowering the load. The effective power consumption of the induction motor is determined by the load measuring device based on a measured current and measured voltage of the induction motor. The measured effective power consumption is then compared with a reference power, which is calculated as the power output of the induction motor driving a nominal load of the lifting mechanism, to calculated an instantaneous load on the lifting mechanism. The inventive apparatus and process advantageously requires no modifications or additions to load carrying parts of a lifting mechanism or carrying gear and provides accurate real time measurement of the load.

14 Claims, 1 Drawing Sheet

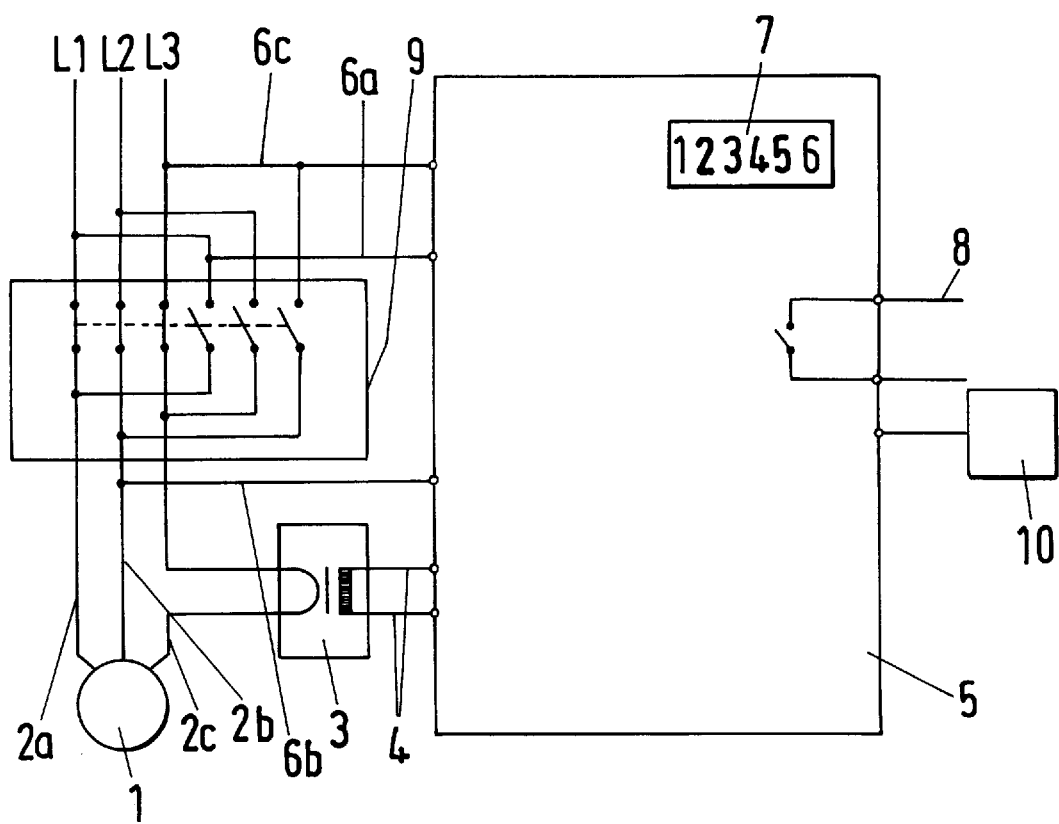

APPARATUS AND PROCESS FOR DETERMINING THE INSTANTANEOUS AND CONTINUOUS LOADS ON A LIFTING MECHANISM

BACKGROUND OF THE INVENTION

1. Field of the Invention

The present invention is directed to an apparatus and process for detecting the instantaneous load and/or continuous load on a transporting means, and in particular on a lifting mechanism, comprising a load measuring device and an electric motor as a driving means for lifting and lowering the load.

2. Description of Related Art

Load measuring devices for hoists are known. German patent publication 28 23 401 A1 discloses a load measuring device for a hoist with a lifting mechanism motor arranged in the load carrying means and which detects the load using a tension measurement rod. The tension measurement rod includes a wire strain gauge, the electrical resistance of which changes or varies as a function of the carried load imposed on the lifting mechanism whereby an electrical signal proportional to the carried load is generated by detecting the resistance of the wire strain gauge or the voltage drop across the gauge at a constant current flow. A special bridge circuit of the wire strain gauge and resistors is used to precisely determine the carried load. This load measuring device may be employed to continuously monitor the load of the lifting mechanism and protect against overloading thereof by connecting the device to electronic warning devices which automatically switch off the lifting mechanism when a nominal load is exceeded. The measuring elements of this conventional load measuring device are arranged in specially constructed carrying parts of the lifting mechanism or crane, an arrangement that increases the overall cost of the device. Moreover, the conversion steps or operations necessary to retrofit existing operating lifting mechanisms with this load measuring device are relatively expensive and time-consuming.

Load measuring devices are also used to detect load characteristics of lifting mechanisms by determining and summing destructive load values with the aid of the measured carried loads while taking the loading duration into account. In this regard, German patent publication 2 95 03 416 U1 discloses a device for determining the dynamic stress of structural component parts, plants and machinery; the device measures load values over several load changes and stores the summed value in a memory in order to monitor plant stress. A warning signal is triggered when the summed total load value is exceeded. Existing lifting mechanism devices already in operation may be refurbished and/or replaced with this type of load measuring device in a relatively short conversion process and in accordance with relevant legal regulations and guidelines so as to optimize the service life of the lifting mechanism. This process and system, however, disadvantageously incurs a relatively high cost of operation to detect the total load and in monitoring the useful life threshold.

A known method for determining the summed load values of a lifting mechanism is to connect an operating time meter to the device, as for example in the power supply feed to the lifting motor. This relatively simple method, however, only roughly measures the continuous load on the lifting mechanism. As a result, allowances must be made for the gross inaccuracy of this method of detecting total load by selecting appropriately high safety or error margins. As a result, lifting mechanisms that generally operate in the lower partial load range are typically prematurely i.e., before the device actually reaches its fullest inherently possible service life, refurbished or replaced for safety reasons and in order to meet applicable legal regulations and guidelines, thus resulting in increased costs.

The object of the present invention is therefore to provide a device for detecting the instantaneous load and/or continuous load on a lifting mechanism and requiring no modifications or additions to the mechanism's carrying parts or carrying gear while providing an accurate measurement. It is also an object of the invention to provide a relatively simple detection device for accurately determining the continuous load on a lifting mechanism.

SUMMARY OF THE INVENTION

The present invention is directed to a process and apparatus for determining a load on a lifting mechanism, which comprises a load measuring device and a three-phase induction motor for lifting and lowering the load. The effective power consumption of the induction motor is determined by the load measuring device on the basis of measured current and measured voltage of the induction motor as measured by the load measuring device. The effective power consumption is then compared with a reference power, which is the power output of the induction motor driving a nominal load on the lifting mechanism, to provide an instantaneous load on the lifting mechanism.

The inventive construction may be employed to determine both the instantaneous load and the continuous load with relatively high accuracy, particularly in the range of the nominal load, without the need for any modifications or additions to carrying parts of the transporting means. The load may be determined, for example, on the basis of effective power consumption of the three-phase induction motor with a margin of error between approximately 1% and 2%, especially when the load is in the range of the nominal load. Therefore, the inventive apparatus may be used as a load monitoring device for protecting the transporting means by accurately detecting an overload.

In addition, the inventive apparatus also detects the continuous load of the transporting means. When detecting the continuous load over a relatively long period of time, the elevated margin of error in the partial load range is of secondary importance because the ratio of partial load to nominal load is calculated to the third power in the continuous load of the transporting means in determining the threshold value for the useful life of the transporting means. Thus, relatively high measurement accuracy necessary for determining with sufficient accuracy the continuous load on the transporting means is realized.

In a preferred embodiment, the instantaneous load is calculated as the ratio or the difference between the effective power consumption and the reference power and is displayed on a display device so that the instantaneous load may be monitored by an operator.

The transporting means may include means for automatically protecting against overload, as for example a switch-off device which interrupts or stops the lifting movement or operation by cutting off power to the motor when the instantaneous load exceeds permissible or acceptable load values.

The continuous load on the transporting means is determined by integrating over time the detected instantaneous load values of the transporting means which are stored in a memory device, and is displayed by a load display device.

As a result, the continuous load on the transporting means is relatively simply and accurately detected and displayed.

The reference power B for substantially vertical lifting of the load is determined from the driving torque of the three-phase induction motor for a nominal load and from the synchronous rotary frequency as $$B=(m \cdot g \cdot R_{TR})/(\eta \cdot i \cdot z) \cdot 2\pi \cdot f/p,$$

where m is the nominal load, g is acceleration due to gravity, $R_{TR}$ is the drum radius of the lifting mechanism, f is the frequency of the power supply to the induction motor, i is the transmission ratio between the gears of the lifting mechanism, z is the shear load on the cable of the lifting mechanism, p is the number of pole pairs of the induction motor, and $\eta$ is the transmission efficiency of the lifting mechanism.

It is advantageous to use a power variable calculated from the design parameters of the transporting means as a reference power of the transporting means so as to obviate the need for time-consuming and/or frequent calibration measurements.

In order to improve the accuracy of detection of the continuous load and/or of the instantaneous load which is determined by comparing the effective power consumption with the reference power, the measured effective power consumption is reduced by the current heat loss i.e., Joule heat loss, of the stator winding of the motor since this heat loss does not contribute to the lifting work of the transporting means. The heat loss of the stator winding of the motor may be readily determined from the measured current and electrical resistance of the stator winding of the motor. The accuracy of detection of the heat loss may also be improved by measuring the temperature of the stator winding and calculating the corrected electrical resistance of the stator winding based on the initial resistance or cold resistance.

The accuracy of detection of the continuous load and/or instantaneous load is improved in that the measured effective power consumption is reduced by the no-load loss of the transporting means, that is by a corresponding offset, since this no-load loss does not contribute to the lifting operation of the transporting means. The no-load loss is determined by measuring the power consumption of the transporting means in the absence of the load.

A reversing switch is provided for reversing the motor phase leads and the direction of rotation of the three-phase induction motor. The measurement of current used to determine the effective power consumption of the three-phase induction motor is detected by a current transformer that detects the current in one of the motor phase leads which is reversed so as to change the direction of rotation. This advantageously differentiates the different phase sequences between measured current and measured voltage when "lifting the load" and when "lowering the load", so that the continuous load and/or instantaneous load is determined based on the effective power consumption in the "lifting the load" state.

The voltage is measured between the motor phase lead whose current is being detected and one of the two other motor phase leads. Measuring the voltage in this way is advantageous since the voltage and current must be measured simultaneously when in the "lifting the load" state.

The distinguishability of the effective power consumption with reference to the two states i.e., "lifting the load" and "lowering the load", is ensured in that the voltage is measured between the motor phase lead whose current is being detected and the each of the two other motor phase leads. Specifically, the voltage measurement of the motor phase lead which is not reversed is determined in upstream of the reversing switch and the voltage measurement of the reversed motor phase lead is determined downstream of the reversing switch relative to the potential of the motor phase lead whose current is being detected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

The FIGURE schematically depicts a device for detecting the load of a lifting mechanism with a three-phase induction motor and an evaluating device in accordance with the present invention.

DETAILED DESCRIPTION OF THE PRESENTLY PREFERRED EMBODIMENTS

The FIGURE depicts an apparatus constructed in accordance with the present invention for detecting the instantaneous load and/or the continuous load on a lifting mechanism (not shown), such as a hoist, driven by a three-phase induction motor 1. The three-phase induction motor 1 includes a short-circuit rotor and is connected to three-phase power phases L1, L2, L3 of a three-phase power supply by motor phase leads or wires 2a, 2b, 2c. The motor phase lead 2c is connected to a current transformer 3 which is used to measure the stator current of the asynchronous motor 1. In particular, the current transformer 3 generates at its output a voltage proportional to the stator current. The output of the current transformer 3 is connected to an evaluating unit 5 by leads or wires 4. In addition, the motor phase leads 2a, 2b, 2c are connected to the evaluating unit 5 by leads or wires 6a, 6b, 6c. The evaluating unit 5 operatively determines the effective power consumption of the three-phase induction motor 1 based on measured voltage values and current values of the motor 1. The effective power consumption is measured or calculated by the evaluating unit 5 only in the "lifting the load" state since it is only in this state that a uniquely defined relationship exists between the effective power consumption and a reference power of the lifting mechanism.

The calculated effective power consumption is reduced in the evaluating unit 5 by an offset for the no-load loss of the lifting mechanism, including magnetic hysteresis losses of the magnet plates and friction losses of the rotor of the three-phase induction motor 1. In one embodiment of the present invention, the no-load loss is determined by measuring the output of the three-phase induction motor 1 when operated in a no-load condition. In an alternative embodiment or modification, the no-load loss is calculated using the design specifications or design data of the lifting mechanism which is stored in a memory device, preferably in a memory device in the evaluating unit 5.

The effective power consumption is corrected in each instance by the heat loss i.e., the Joule heat loss, of the stator winding of the motor which is calculated based on the measured current and the electrical resistance of the stator winding of the three-phase induction motor 1. The cold resistance of the stator winding, which may be calculated from the winding specifications of the motor 1, is used as the electrical resistance value of the stator winding. In addition, compensation for the temperature dependence of the electrical resistance value of the stator winding may also be incorporated in the calculation by detecting the winding temperature and adding an appropriate positive or negative correction or compensation value to the cold resistance. The so-determined electrical resistance value of the stator winding is likewise stored in the memory of evaluating 5.

The evaluating unit 5 determines the instantaneous load of the lifting mechanism based on the reference power and displays the difference or the ratio between the measured effective power consumption and the reference power. The reference power B is calculated, based on the nominal load, using the relationship $$B=(m \cdot g \cdot R_{TR})/(\eta \cdot i \cdot z) \cdot 2\pi \cdot f/p,$$

where m is the nominal load, g is acceleration due to gravity, $R_{TR}$ is the drum radius of the lifting mechanism, f is the frequency of the power supply to the induction motor, i is the transmission ratio between the gears of the lifting mechanism, z is the shear load on the cable of the lifting mechanism, p is the number of pole pairs of the induction motor, and $\eta$ is the output efficiency of the lifting mechanism.

As is evident from the equation, the reference power B is calculated using only the design data or design specifications of the particular lifting mechanism. The reference power is that portion of power which is expended or consumed by the three-phase induction motor 1 from the three-phase power supply and transmitted across the motor air gap in order to generate the torque provided or generated by the drive shaft of the motor 1 for lifting the nominal load at a substantially constant lifting velocity.

The reference power is calculated from the rotary field output of the motor 1 at nominal load and is provided by the rotary frequency at which the magnetic field of the stator rotates in the air gap between the stator and rotor of the motor 1 and by the delivered torque. Due to the magnetic force across the air gap, the rotary field output and the delivered torque are directly proportional. As a result, the reference power is a measurement of the required or necessary load-dependent component of the power which is transmitted to the rotor across the air gap of the motor for lifting the nominal load. Thus, the instantaneous load is used to determine the load on the lifting mechanism by comparing the effective power consumption of the induction motor 1 measured on the stator side with the calculated reference power.

The difference or the ratio of the effective power consumption and the reference power, which is approximately equal to the difference or the ratio of the instantaneous load and the nominal load, is displayed on a display device 10 (which is preferably integral to the structure of the evaluating unit 5) as an instantaneous load so that the operator may dynamically monitor the load of the lifting mechanism in real time. A control line 8 is provided with a switch which, in the figure, is shown in the open state. The switch is opened when the instantaneous load exceeds a predetermined permissible or acceptable load value so as to interrupt the current supply to the three-phase induction motor 1. The control line 8 is activated only when the lifting mechanism is in the "lifting the load" state.

In order to selectively lift or lower a load with the lifting mechanism, the connections of the two motor phase leads 2b, 2c of the three leads 2a, 2b, 2c to the three-phase power phases L1, L2, L3 are reversed by actuation of a reversing switch 9. The current transformer 3 is connected so that it detects or measures the current in one of the two reversed motor phase leads 2b or 2c. To obtain the measured voltage for used in determining the effective power consumption, the motor phase leads 2b, 2c are connected to leads 6b, 6c which, in turn, are connected to a voltage measurement device (not separately shown in the figure) incorporated in the evaluating unit 5, and the voltage is measured between the reversed lead 2b or 2c whose current is being detected and one of the two other leads.

The voltage and current can only be measured simultaneously in the "lifting the load" state. For this reason, the lead 6c connecting the motor phase lead 2c and the evaluating unit 5 is provided for measuring the voltage between the motor phase lead 2c (whose current is being detected) and the two other motor leads 2a, 2b. In so doing, the voltage measurement of the motor lead 2a which is not reversed is taken in front or upstream of the reversing switch 9 and the voltage measurement of the reversed motor lead 2c or 2b is taken behind or downstream of the reversing switch 9 relative to the potential of motor lead 2a. The two operating states of the lifting device—i.e. lifting and lowering of a load are differentiable in the evaluating unit 5 so that the current and voltage are measured only when the load is being lifted; based on these measured values, the effective power consumption of the motor 1 is determined and compared with the reference power to calculate the instantaneous load. Only the effective power consumption is used for determining the instantaneous load since only the effective power consumption is proportional to the instantaneous load. The evaluating unit 5 thus determines whether the lifting mechanism is in the "lifting the load" state or in the "lowering the load" state and accordingly determines the relevant effective power for detecting the instantaneous load and/or the continuous load. In a preferred embodiment, the instantaneous load and/or the continuous load is detected when the load is lifted at an approximately constant lifting velocity. Therefore, the instantaneous load and/or the continuous load is detected after only a relatively short delay, i.e. after the conclusion of the starting process or warm-up phase.

In the evaluating unit 5, the detected instantaneous load values are stored in a memory device and these stored values are integrated over time to produce a continuous load which is displayed by the load displaying device 7. In an alternate embodiment or modification, the continuous load of the lifting mechanism may be calculated as the ratio of partial load to nominal load to the third power. The wires or leads used to measure voltage simultaneously supply power to the evaluating unit 5.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A process for determining a load on a lifting mechanism including a load measuring device and a three-phase induction motor for lifting and lowering the load, wherein the induction motor has a stator winding, said process comprising the steps of:

(a) determining an effective power consumption of the induction motor using the load measuring device based on a measured current and a measured voltage of the induction motor and compensating the determined effective power consumption by an offset amount for heat loss in the stator winding of the induction motor; and (b) calculating an instantaneous load on the lifting mechanism by comparing the determined effective power consumption with a reference power comprising a power consumption of the induction motor driving a nominal load of the lifting mechanism.

2. The process in accordance with claim 1, wherein said step (b) comprises the steps of:

(c) calculating the instantaneous load on the lifting mechanism as a difference between the determined effective power consumption and the reference power; and (d) displaying the instantaneous load of the lifting mechanism on a display device for monitoring of the load.

3. The process in accordance with claim 1, further comprising the step of switching off the induction motor while lifting the load when the calculated instantaneous load exceeds a predetermined permissible load.

4. The process in accordance with claim 1, further comprising the steps of:

(e) integrating over time the calculated instantaneous load using the load measuring device to determine a continuous load on the lifting mechanism;

(f) storing the determined continuous load in a memory device; and (g) displaying the determined continuous load on a load display device.

5. The process in accordance with claim 1, wherein said step (b) further comprises the step of calculating the reference power using $$B = (m \cdot g \cdot R_{TR})/(\eta \cdot i \cdot z) \cdot 2\pi \cdot f/p,$$

where m is the nominal load;

g is acceleration due to gravity;

$R_{TR}$ is a drum radius of the lifting mechanism;

f is a power supply frequency to the induction motor;

i is a transmission ratio between gears of the lifting mechanism;

z is a shear load on a cable of the lifting mechanism;

p is a number of pole pairs of the induction motor; and

η is a transmission efficiency of the lifting mechanism.

6. A process for determining a load on a lifting mechanism including a load measuring device and a three-phase induction motor for lifting and lowering the load, said process comprising the steps of:

(a) determining an effective power consumption of the induction motor using the load measuring device based on a measured current and a measured voltage of the induction motor, wherein said step of determining an effective power consumption includes the steps of reversing a direction of rotation of the induction motor by reversing two of the motor phase leads using a reversing switch, measuring current flow in one of the two reversed motor phase leads using a current transformer, and determining the measured voltage between the motor phase lead whose current is being detected and one of the two other motor phase leads; and (b) calculating an instantaneous load on the lifting mechanism by comparing the determined effective power consumption with a reference power comprising a power consumption of the induction motor driving a nominal load of the lifting mechanism.

7. The process in accordance with claim 1, wherein said step (a) further comprises determining the heat loss in the stator winding of the induction motor based on a measured current in and an electrical resistance of the stator winding.

8. The process in accordance with claim 7, wherein the electrical resistance of the stator winding is a cold resistance of the stator winding.

9. The process in accordance with claim 8, further comprising the steps of:

(i) detecting a temperature of the stator winding of the induction motor; and (j) measuring the stator winding resistance at the detected temperature; and (k) calculating the cold resistance of the stator winding using the measured resistance and the detected temperature.

10. The process in accordance with claim 1, wherein said step (a) further comprises adjusting the effective power consumption by a no-load offset loss of the lifting mechanism.

11. The process in accordance with claim 1, wherein the induction motor is connected to a power supply by three motor phase leads, and wherein said step (a) further comprises reversing a direction of rotation of the induction motor by reversing two of the motor phase leads using a reversing switch.

12. The process in accordance with claim 11, wherein said step (a) further comprises measuring current flow in one of the two reversed motor phase leads using a current transformer.

13. The process in accordance with claim 6, wherein the voltage is measured between the motor phase lead whose current is being detected and each of the two other motor phase leads, and wherein the voltage measurement of the motor phase lead which is not reversed is measured upstream of the reversing switch and the voltage measurement of the reversed motor phase lead is measured downstream of the reversing switch relative to a potential of the motor phase lead which is not reversed.

14. An apparatus for determining a load on a lifting mechanism including a three-phase induction motor for lifting and lowering the load and having three motor phase leads, said apparatus comprising:

a reversing switch connected to the three motor phase leads for reversing a direction of rotation of the induction motor by reversing two of the motor phase leads;

a current transformer connected to measure current flow in one of the two reversed motor phase leads;

a load measuring device connected to said current transformer and the three motor phase leads for measuring a voltage between the one motor phase lead whose current is being detected and one of the other motor phase leads and for determining an instantaneous load on the induction motor based on the measured current, the measured voltage and a reference power output of the induction motor as the lifting mechanism lifts a nominal load, wherein the reference power output is calculated using $$B = (m \cdot g \cdot R_{TR}) / (\eta \cdot i \cdot z) \cdot 2\pi \cdot f / p,$$

where m is the nominal load;

g is acceleration due to gravity;

$R_{TR}$ is a drum radius of the lifting mechanism;

f is a power supply frequency to the induction motor;

i is a transmission ratio between gears of the lifting mechanism;

z is a shear load on a cable of the lifting mechanism;

p is a number of pole pairs of the induction motor; and $\eta$ is a transmission efficiency of the lifting mechanism.

* * * * *